Jan. 6, 1948. C. I. FIELDS 2,434,205
MEANS FOR ASCERTAINING ACTUAL POSITIONING OF AUTOMOBILE WHEELS
Original Filed June 15, 1942 2 Sheets-Sheet 1
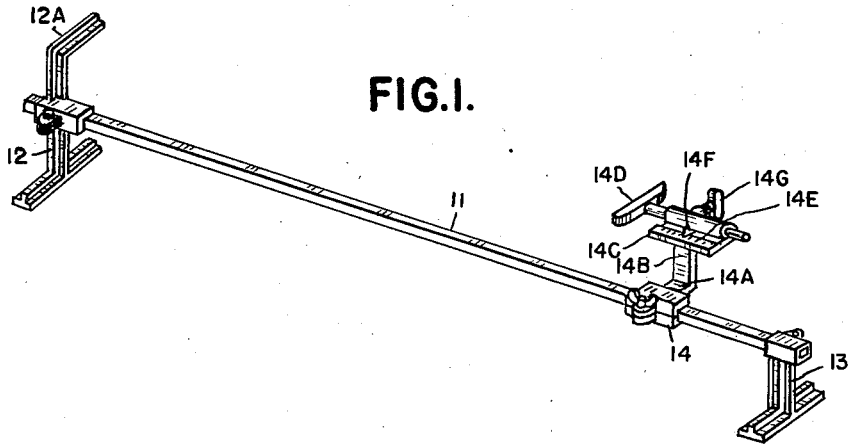
FIG.1.
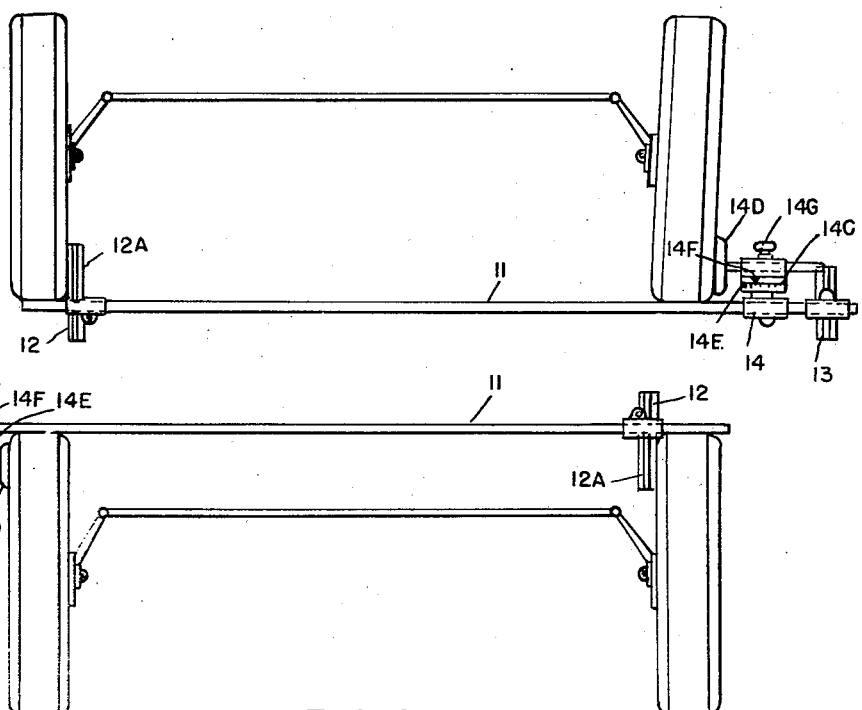
FIG.2.
FIG.3.
INVENTOR.
CHARLES I. FIELDS
BY
ATTORNEYS

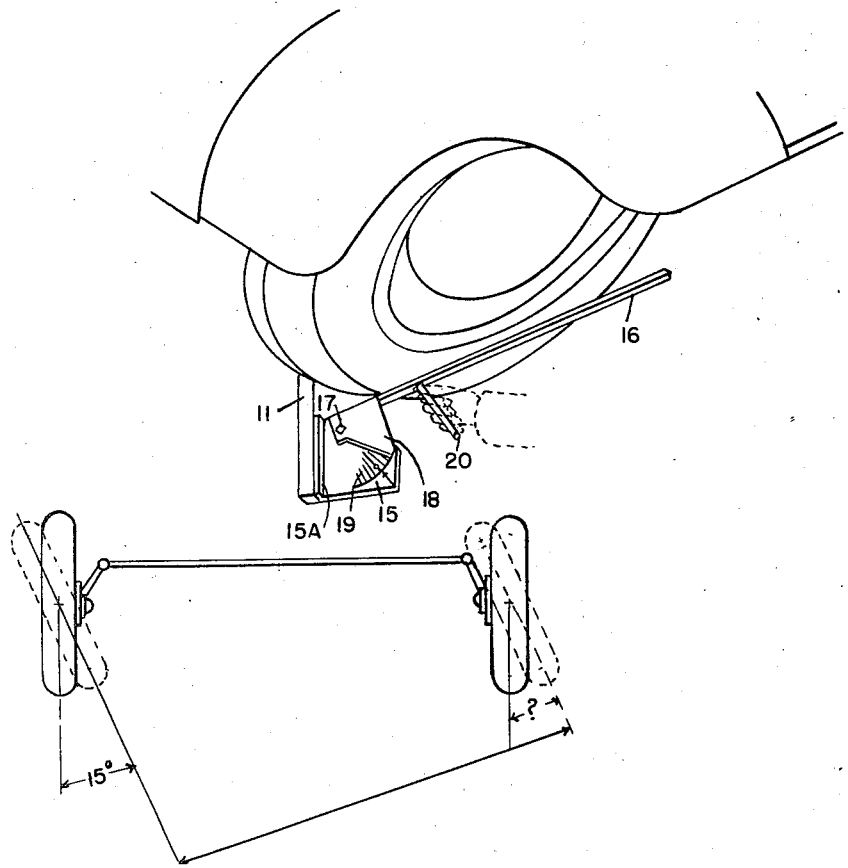

Patented Jan. 6, 1948

2,434,205

UNITED STATES PATENT OFFICE 2,434,205

MEANS FOR ASCERTAINING ACTUAL POSITIONING OF AUTOMOBILE WHEELS

Charles I. Fields, Detroit, Mich., assignor to Arthur Jans, Detroit, Mich.

Original application June 15, 1942, Serial No. 447,080. Divided and this application August 31, 1944, Serial No. 552,150

1 Claim. (Cl. 33—203.17)

This application is a division of my copending application Serial No. 447,080, filed June 15, 1942, now Patent 2,357,463, granted September 5, 1944.

This invention relates to means for ascertaining the actual positioning of automobile wheels, and particularly the steering wheels, with relation to desired positioning thereof, including the toe-in position of both wheels, and the steering wheel geometry, whereby the variations from factory specifications, out of alignment conditions, and/or bent members, such as steering arms, can readily be found.

The principal object of my invention is provision of simple, rugged and practical means for ascertaining the actual positioning of automobile wheels without complicated calculations.

A further object is to provide such means with easily read indications whereby changes from desired positionings can readily be checked by the operator's superior or viewed by the automobile owner.

Other objects and advantages will be apparent to those skilled in the art from the following description, wherein reference is made to the accompanying drawings, illustrating a preferred embodiment of my invention, and wherein similar reference numerals designate similar parts throughout the several views.

In the drawings:

Fig. 1 is a perspective view of a trammel bar with adjustable brackets and traveling gauge mounted on one of such brackets for determining toe-in and toe-out positions of wheels.

Fig. 2 is a plan view showing the trammel bar and attached brackets contacting the forward portions of the tires of front wheels, in position for determining toe-in of wheel.

Fig. 3 is a view similar to Fig. 2 but with the trammel bar and brackets contacting the tire portions in the rear of the front wheels.

Fig. 4 is a perspective view showing an angle gauge in cooperating position with the trammel bar for indicating the angle to which a front wheel has been turned.

Fig. 5 is a plan view showing in diagram the steering geometry of vehicle front wheels when one wheel is turned to a definite angle.

Referring now to the drawings, the numeral 11 designates the trammel bar, herein shown as a hollow rectangular member slidably mounted in a pair of supporting brackets 12 and 13 respectively, one of the brackets, as 12, having an upward extension terminating in a portion 12A bent at substantially right angles to the body portion of the bracket. Set screws are provided for securing the brackets 12 and 13 in any adjusted position relatively to the bar 11, and the supporting portions of the brackets are such as to support the bar 11 in a horizontal position whenever the brackets rest on a level surface. This arrangement enables a quick check of the floor or other surface on which wheel tests are to be made, and the trammel bar may be moved about to various positions on the floor until a level portion is found, a carpenter's spirit level or similar instrument being laid flat on the upper surface of the trammel bar while the level surface is being sought. Since it is necessary for the front wheels of the vehicle being tested to be absolutely level in order to secure correct caster and camber readings, this use of my improved trammel bar will readily be appreciated.

Slidably mounted on the bar 11 is an adjustable bracket 14 having an offset portion 14A extending in the same direction from the bar 11 as the offset portion 12A of the bracket 12, and carrying an upright portion 14B at the upper extremity of which is mounted a plate 14C having a portion formed as a journal for a traveling gauge bar 14D. The plate 14C carries a graduated scale 14E over which a pointer 14F attached to the gauge 14D moves to enable a ready reading of the movements of the traveling gauge bar 14D. A set screw 14G is also provided in position to lock the guage bar 14D in any desired adjusted position.

My improved trammel bar with its several brackets as above described, is particularly useful in the determination of the toe-in positioning of vehicle front wheels. In determining such toe-in, the trammel bar is preferably first placed against the rear portions of the front wheels in substantially the position shown in Fig. 3, with the adjacent surface of the trammel bar 11 contacting the treads of both wheels and with the bracket 12 arranged with its extended portion 12A contacting the inner side of one tire substantially as shown. The traveling gauge bar 14D is then secured by the set screw 14G with its pointer registering with zero indication centrally of the graduated scale 14E and the bracket 14 is then slid along the bar 11 until the face of the guage bar 14D contacts the outer side of the other tire.

The trammel bar with the brackets 12 and 14 secured by their set screws in the adjusted positions as so determined is then removed from its position in the rear of the front wheels and placed into position at the front of such front wheels, substantially as shown in Fig. 2. It will be noted that the adjacent surface of the bar 11 is again brought into contact with the treads of both wheels and the bracket arm 12A into contact with the inner side wall of one tire. Such positioning will immediately determine whether or not the front wheels have any toe-in, for if they have, the face of the traveling gauge 14D will be separated from the side wall of the opposite wheel, and to determine the amount of such toe-in, it is only necessary to release the set screw 14G and slide the gauge bar 14D towards the wheel until it contacts the outer side wall of the tire. The amount of toe-in can then be read on the indicating scale 14E. The simplicity of this arrangement will immediately be apparent, and its accuracy is evidenced by the fact that straight line positions of the trammel bar are assured by virtue of contacting the treads of both wheels, while the tire sides are always contacted by the bracket arm 12A and gauge bar 14D at the same height.

To determine wheel wobble or bent wheel conditions, the points at which the above measurements were made are marked on the wheels, and then the car is rolled forward one-half turn of the wheels. The measurements are then repeated at the back and front of the front wheels and the differences, if any, noted. It will also be noted that the car owner, or the mechanic's superior, can readily check the reading at any position.

My improved trammel bar is also useful in ascertaining the steering geometry of the vehicle's front wheels, or what is sometimes known as turning radius run-out. With this in view, I utilize the trammel bar with its inner face contacting the treads of the wheels as a base line from which to accurately measure the angle of wheel turn-out when check readings are made. Such angle gauge is shown in Fig. 4 and comprises a base plate 15 having an upstanding flange 15A at right angles to the plate for use as a guide in positioning the plate for checking purposes. An elongated swinging member 16 is pivoted, as at 17, adjacent one corner of the plate 15 and carries adjacent its pivoted end a pointer 18 cooperating with a radially marked indicating scale 19 to show the angle of the swinging member 16 relatively to the base plate. The zero position on the scale is preferably when the member 16 is at right angles to the flange 15A of the base plate and graduations extend on opposite sides of such zero position. A handle 20 is secured to the member 16 for convenient swinging movement as desired.

When it is desired to ascertain the steering geometry of the vehicle's front wheels, the trammel bar 11 is arranged adjacent the fronts of the wheels then turned, say to the left, until the right-hand wheel is set at a 15° angle. To ascertain this angle exactly, the trammel bar is placed to contact with the fronts of the wheels, and the flange 15A of the angle gauge placed against the trammel bar substantially as shown in Fig. 4. The swinging member 16 is then moved into contact with the side wall of the tire and the angle of turning of the wheel may readily be read on the scale 19. After the right-hand wheel is accurately set at the desired angle, say 15°, as for example shown in Fig. 5, the position of the trammel bar is reversed and the angle gauge similarly placed to contact the side wall of the left-hand wheel to read its angular position. While steering geometry will vary with car models, the angle of the left-hand wheel in the above cited instance should read 18° plus or minus 1°, and variations from this reading will indicate a bent radius rod on the left-hand wheel. Similarly, the steering geometry of the opposite wheel can be ascertained by then turning the wheels to the right until the left-hand wheel sets at a 15° angle as measured by the angle gauge. Then reverse the position of the trammel bar, and with the angle gauge, read the angle of the right-hand wheel. This should read 18° plus or minus 1°, and variations from this reading indicate a bent radius rod on the right-hand wheel.

The simplicity and ease of thus checking the steering geometry with factory specifications will readily be noted, and also that after a bent radius rod has been replaced, the front end can be rechecked quickly and positively.

I am aware that the invention may be embodied in other specific forms without departing from the spirit or essential attributes thereof, and I therefore desire the present embodiment to be considered in all respects as illustrative and not restrictive; reference being had to the appended claim rather than to the foregoing description to indicate the scope of the invention.

I claim:

Means for ascertaining the actual positions of vehicle front wheels including a horizontal trammel bar adapted to simultaneously contact the treads of the tires of both front wheels at a substantial distance above the floor and carrying a pair of slidable brackets provided each with a raised angular arm offset toward the axles of said wheels, the offset arm of one bracket directly engaging the side wall of the tire of one wheel, and a gauge having an indicating scale mounted on the offset arm of the other bracket, said gauge including a slidable element adapted to engage the side wall of the tire of the other wheel and carrying a pointer movable over said scale.

CHARLES I. FIELDS.

REFERENCES CITED

The following references are of record in the file of this patent:

UNITED STATES PATENTS

| Number | Name | Date |
|---|---|---|
| 1,458,598 | Spangenberg | June 12, 1923 |
| 1,822,983 | Vanica | Sept. 15, 1931 |
| 2,098,749 | Johnston | Nov. 9, 1937 |
| 2,159,084 | Harrison | May 23, 1939 |